United States Patent [19]
Beling

[11] 3,735,141
[45] May 22, 1973

[54] ELECTRONIC LIGHTING CONTROL RESPONSIVE TO AMBIENT LIGHT

[75] Inventor: Thomas E. Beling, Saxonville, Mass.
[73] Assignee: Sigma Instruments, Inc., South Braintree, Mass.
[22] Filed: Sept. 1, 1971
[21] Appl. No.: 176,808

[52] U.S. Cl................250/214 R, 250/209, 315/159
[51] Int. Cl................................................H01j 39/12
[58] Field of Search..................250/206, 214 R, 209, 250/208, 205; 315/151, 158, 159, 156; 307/117, 311

[56] References Cited

UNITED STATES PATENTS

| | | | |
|---|---|---|---|
| 3,633,036 | 1/1972 | Nuckalls | 315/159 X |
| 3,483,430 | 12/1969 | Nuckalls et al. | 250/209 X |
| 3,042,807 | 7/1962 | Vize | 250/213 A |
| 3,392,284 | 7/1968 | Cain | 250/206 X |
| 3,416,032 | 12/1968 | Jahns et al. | 250/205 X |

Primary Examiner—Walter Stolwein
Attorney—David Toren and Bernard X. McGeady

[57] ABSTRACT

In the disclosed control, a light source is turned on and off bistably in response to ambient light. To do this, a photoresistor or photocell, whose resistance increases with decreasing light, is exposed to the ambient light. The photoresistor or cell forms part of a voltage-energized voltage divider, and is connected across a neon lamp from which the cell is shielded. When the ambient light is sufficiently dim the lamp is lit. The current through the neon lamp is intensified with a second photoresistor or photocell in series with the lamp and subject to decreasing resistance as the lamp brightens. This constitutes a positive feedback and holds the neon lamp on. A third photoresistor or photocell in series with a switch responds to the bright lamp to turn on the switch and hence the light source. When the ambient light reduces beyond a given threshold the first photocell turns off the lamp and the second photocell increases its resistance enough to hold off the lamp.

19 Claims, 2 Drawing Figures

PATENTED MAY 22 1973 3,735,141

THOMAS E. BELING
INVENTOR.

BY Toren and McGeady
ATTORNEYS

ELECTRONIC LIGHTING CONTROL RESPONSIVE TO AMBIENT LIGHT

BACKGROUND OF THE INVENTION

This invention relates to electronic lighting controls, and particularly to electronic lighting controls that turn a light on and off when ambient light levels are such that additional lighting is desired.

Such devices generally employ a photosensitive cell which detects changes in ambient light and then controls a switching device, such as an electromechanical relay or a solid state device. The relay or the solid state device accomplishes the appropriate switching of the lights.

One of the difficulties in the manufacture of such devices is the fact that it is, as a practical matter, necessary to achieve a "snap" action in the switching operation despite the fact that the illumination level may change gradually. An example of such gradual change occurs in the natural light level at twilight or dawn.

The need for a snap action arises for a number of reasons. In an electromechanical relay, contact chatter caused by slow closure in response to gradual changes in the illumination level will damage or destroy the contacts. With a solid state device, such as a Triac switch, a slow change from off to the on condition will frequently result in a nonsymmetrical output waveform which contains an average value, that is to say direct voltage, component. This average value component is not acceptable for use with systems such as mercury vapor lamps utilizing inductive type ballasts. An average value on the incoming waveform will result in excessive current flow and damage to the solid state switch.

When using electromechanical relays, the snap action problem is commonly resolved by designing and adjusting the relays critically. In a solid state switch, some electronic means of introducing hysteresis, such as a Schmitt trigger is commonly used. However, a Schmitt trigger has some disadvantages in this connection.

An object of this invention is to improve lighting controls. Another object of this invention is to introduce improved means for producing snap action in lighting controls.

SUMMARY OF THE INVENTION

According to a feature of this invention, these objects are attained and the disadvantages of the prior art obviated, in lighting control for turning an illuminating source on and off in response to ambient light conditions, by energizing light means with first photoelectric means responsive to the ambient light so as to turn the light means brighter or dimmer. Second photoelectric means responsive to the light means and electrically connected to the light means make the light means brighter as the light means turns bright and dimmer as it turns dim. Control means responsive to the condition of the light means turn the source on and off. The second photoelectric means, by responding to the light means, produces a positive feedback that assures a bistable lighting condition.

According to another feature of the invention the first photoelectric means is such that the light means becomes brighter as said first photoelectric means is subject to less ambient light.

According to another feature of the invention the second photoelectric means includes a photoelectric resistor in series with the light means and responsive to lower its resistance when subjected to more light from the light means.

According to another feature of the invention the photoelectric means includes a voltage divider adapted to be connected across a voltage source and having a photoresistor connected across the light means so as to increase the voltage across the light means when the ambient light decreases.

According to yet another feature of the invention the light means includes a voltage breakdown device.

According to still another feature of the invention the control means includes third photoelectric means responsive to the light means and signal responsive means connected in series with the third photoelectric means. The third photoelectric means decreases its resistance in response to light from the light means so as to increase the signal to the signal responsive means as the light from the light means becomes brighter.

According to yet another feature of the invention the signal responsive means includes a relay coil forming part of the relay.

According to yet another feature of the invention the signal responsive means includes a semiconductor switch.

According to still another feature of the invention the breakdown device includes a neon lamp.

These and other features of the invention are pointed out in the claims. Other objects and advantages of the invention will become obvious from the following detailed description when read in light of the accompanying drawings.

DETAILED DESCRIPTION OF PREFERRED EMBODIMENTS

Figure 1:
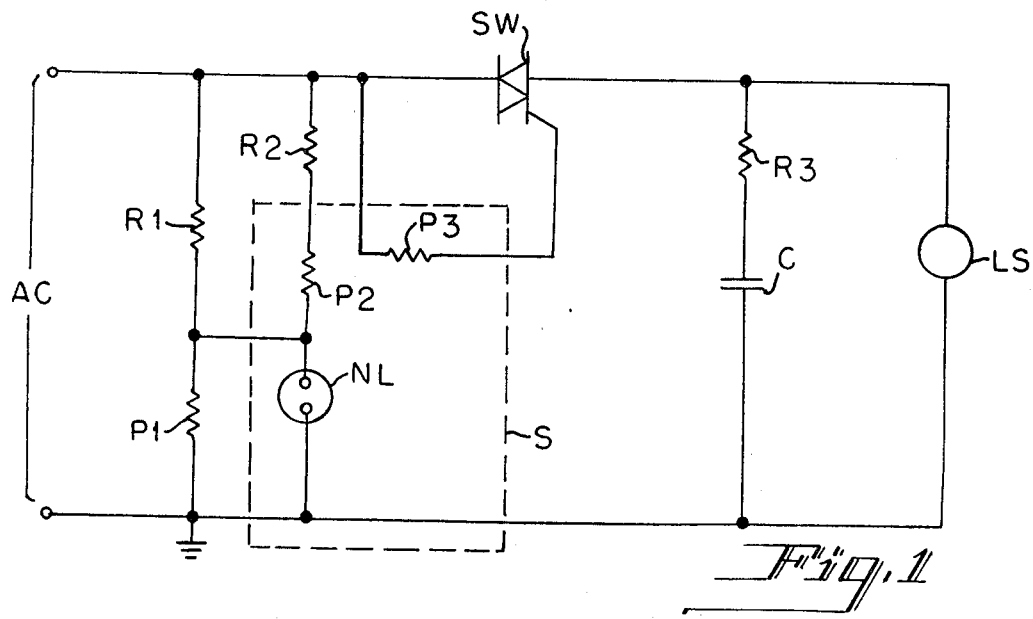
FIG. 1 is a schematic circuit diagram of an electronic lighting control embodying features of the invention.

In FIG. 1 an alternating source AC forms a varying potential across a neon lamp NL by means of a voltage divider composed of a resistor R1 and a photocell P1 which responds to ambient light. The voltage across the neon lamp NL thus corresponds to the voltage appearing across the photocell P1. The photocell P1 is such as to increase its resistance as the ambient light decreases. As a result when the ambient light decreases the increased resistance places a higher and higher voltage across the neon lamp NL. When the ambient light decreases, a point is reached where the resistance of photocell P1 has a voltage thereacross sufficient to fire the lamp NL.

Firing of the neon lamp NL illuminates two photocells P2 and P3. The photocell P2 connects the neon lamp NL across the source AC through itself and a resistor R2. As the illumination of the photocell P2 by the neon lamp NL occurs it decreases the resistance of the photocell P2 thereby allowing greater current flow through the lamp NL. This intensifies the brightness of the neon lamp NL and decreases the resistance of photocell P2 even further. This regenerative process has the effect of producing the desired snap action.

Firing of the neon lamp NL also illuminates the photocell P3. The latter applies a control current to the control terminal of a switching device SW. According to one embodiment of the invention the switching device SW is a Triac. According to another embodiment it is any type of thyristor. The lowered resistance of the photocell P3 allows sufficient current to flow into the gate of the switching device SW from the AC source to fire it. As can be seen, when the fired neon lamp NL illuminates the photocell P3 the resistance of the photocell P3 declines, thus raising the current at the gate or control terminal of the switching device SW. This turns on the switching device SW and allows the voltage source AC to apply its voltage across the light source LS to be controlled. This turns on the light source rapidly with the snap action and without the need for expensive equipment to produce the snap action.

The illumination of the photocell P2 by the neon lamp NL holds the photocell P3 in its low resistance condition. Thus, it applies its turn-on current to the switching device SW continuously from the alternating source AC.

A resistor R3 and a capacitor C connected in series across the light source LS served as snubbing components to allow the Triac switching device to operate into an inductive circuit such as a typical ballast.

As the ambient light level increases the resistance of the photocell P1, and hence the voltage across the photocell P1 decreases. Eventually a point will be reached where the voltage across the photocell P1 and hence the neon lamp NL, will diminish the light intensity from the neon lamp. As the light output decreases the resistance of photocell P2 increases. This further decreases the light output of the lamp NL by increasing the series resistance and reducing the current available to the lamp NL. This regenerative action quickly drives the light output of the lamp NL to zero. It increases the resistance of the photocell P3 so as to reduce the control current of the Triac switching device SW. It turns off the triac switching device and at the same time turns off the light source LS.

According to one embodiment of the invention a resistor is added from the control electrode or gate of the switching device SW to ground. This allows the switching device to be controlled on the basis of a control voltage rather than a control current.

The light source LS according to the invention may be any type of light source such as a fluorescent light source or incandescent light source ( or mercury vapor light source).

Because of the regenerative action of the photocell P2 and the neon lamp NL, the neon lamp may, according to another embodiment of the invention, be replaced by a non-firing lamp such as an incandescent lamp.

In FIG. 1 an optical shield S surrounds the photocells P2 and P3 as well as the neon lamp NL so as to shield the photocells from ambient light and expose them more intimately to the light from the lamp NL. On the other hand the photocell P1 is exposed to the ambient light.

The resistance of the resistor R2, as well as the resistance of the photocell P2, are sufficiently high to prevent firing of the neon lamp in the absence of a sufficient voltage across the photocell P1, with which they form a voltage divider.

Figure 2:
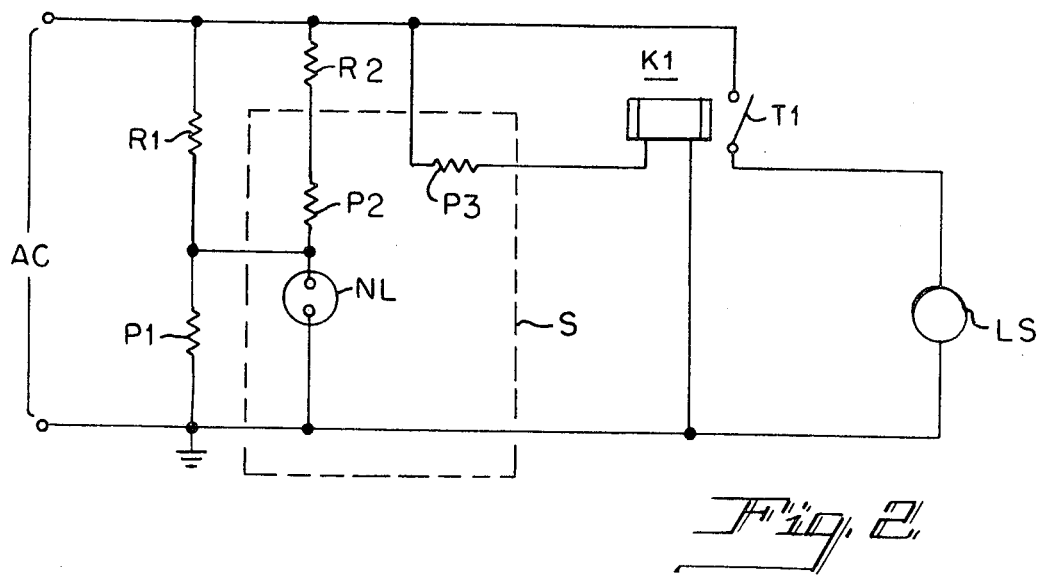
FIG. 2 is a schematic circuit diagram of another electronic lighting control embodying features of the invention.

The control system in FIG. 2 corresponds substantially to that in FIG. 1. Here again the photocell P1 is exposed to ambient light. It forms part of a voltage divider with the resistor R1 across the voltage source AC. When the ambient light striking the photocell P1 is sufficiently low the resistance of the photocell P1 becomes sufficiently high to apply a firing voltage to the neon lamp NL. As in FIG. 1 the neon lamp NL, together with the photocells P2 and P3 are shielded by an optical shield S. Firing of the neon lamp NL illuminates the photocells P2 and P3 so that their resistances decrease. This decrease in the resistance of the photocell P2 allows more current to flow through the neon lamp NL and intensify its light output. This further exposes the photocell P2 to more light and again increases the current. This regenerative action keeps the neon lamp brightly lit and the resistances of the photocells P2 and P3 low. This corresponds to the operation of FIG. 1.

The low resistance of the photocell P3 allows the source AC to apply a holding current to the coil of a relay K1. Because of the regenerative action of the photocell P2 and the neon lamp NL, the neon lamp NL is sufficiently bright to keep the resistance of the photocell P3 low enough to allow flow of an actuating current through the coil of the relay K1. This actuating current pulls in the contact T1 of the relay K1 and completes the circuit from the source AC to the light LS. The light LS corresponds to that of FIG. 1.

As the ambient light level increases, eventually a point will be reached where the light intensity of the neon light diminishes because of the shunting action of the photocell P1. As the light output decreases the resistance of the photocell P2 increases, thereby further decreasing the light output. This regenerative action quickly drives the light output of the neon lamp NL to zero and sharply raises the resistance of the photocell P3. This cuts off the current to the coil of the relay K1. The contact T1 opens and the source LS is extinguished.

It should be noted in FIGS. 1 and 2 that the regenerative action causes the current applied to the switching device SW and the coil of the relay K1 to snap or change in the manner of a step function. The current through the photocell P3 is either very small or very large. The neon lamp is either very bright or extinguished.

According to another embodiment of the invention the photocells P1, P2 and P3 are constructed on a single substrate with suitable interconnections and light isolation by the shield S.

As stated, the light source LS may be of any type such as a mercury vapor lamp, a fluorescent lamp, or an incandescent lamp. It may have any number of purposes such as to illuminate streets through the night or illuminate a household.

According to one or more embodiments of the invention the components shown in FIGS. 1 and 2 have the following values or descriptions:

R1 = 68 K
R2 = 68 K
R3 = 100 Ω
P1 = Cadmium Sulfide Photocell
P2 = Cadmium Sulfide Photocell
P3 = Cadmium Sulfide Photocell
SW = TRIAC C = 0.1 μf
AC = 120 V RMS
K1 = 120 V AC Relay
T₁ = Relay Contacts While embodiments of the invention have been described in detail it will be obvious to those skilled in the art that the invention may be embodied otherwise without departing from its spirit and scope.

What is claimed is:

1. A lighting control for turning an illuminating source on and off in response to ambient light conditions, comprising first photoelectric means responsive to the ambient light, regenerative means coupled to said first photoelectric means for assuming one condition when the ambient light on said first photoelectric means exceeds a given value and for assuming a second condition when the ambient light on said first photoelectric means is less than a given value, said regenerative means including light means coupled to said first photoelectric means for turning brighter or dimmer in response to the first photoelectric means, said regenerative means further including second photoelectric means responsive to light from said light means and electrically coupled to said light means for making said light means brighter as said light means turns bright and dimmer as said light means turns dim, and control means coupled to said regenerative means and responsive to the condition of said regenerative means for turning the source on or off.

2. A control as in claim 1, wherein said light means becomes brighter as said first photoelectric means is subject to less ambient light.

3. A control as in claim 1, wherein said second photoelectric means includes a photoelectric resistor in series with said light means and responsive to lower its resistance when subjected to more light from said light means.

4. A control as in claim 2, wherein said second photoelectric means includes a photoelectric resistor in series with said light means and responsive to lower its resistance when subjected to more light from said light means.

5. A control as in claim 1, wherein said first photoelectric means includes a voltage divider adapted to be connected across a voltage source and having a variable resistance photocell connected across said light means so as to increase the voltage across said light means when the ambient light increases.

6. A control as in claim 3, wherein said first photoelectric means includes a voltage divider adapted to be connected across a voltage source and having a variable resistance photocell connected across said light means so as to increase the voltage across said light means when the ambient light increases.

7. A control as in claim 1, wherein said light means includes a voltage breakdown device.

8. A control as in claim 7, wherein said second photoelectric means includes a photoelectric resistor in series with said light means and responsive to lower its resistance when subjected to more light from said light means.

9. A control as in claim 7, wherein said second photoelectric means includes a photoelectric resistor in series with said light means and responsive to lower its resistance when subjected to more light from said light means.

10. A control as in claim 7, wherein said first photoelectric means includes a voltage divider adapted to be connected across a voltage source and having a variable resistance photocell connected across said light means so as to increase the voltage across said light means when the ambient light increases.

11. A control as in claim 1, wherein said control means includes third photoelectric means optically coupled and responsive to said light means and signal responsive means connected in series with said third photoelectric means, said third photoelectric means decreasing its resistance in response to light from said light means so as to increase the signal to said signal responsive means as said light becomes brighter.

12. A control as in claim 11, wherein said signal responsive means includes a relay coil forming a part of a relay.

13. A control as in claim 11, wherein said current responsive means includes a semiconductor switch.

14. A control as in claim 7, wherein said breakdown device includes a neon lamp.

15. A control as in claim 11, wherein said light means becomes brighter as said first photoelectric means is subject to less ambient light.

16. A control as in claim 11, wherein said second photoelectric means includes a photoelectric resistor in series with said light means and responsive to lower its resistance when subjected to more light from said light means.

17. A control as in claim 15, wherein said second photoelectric means includes a photoelectric resistor in series with said light means and responsive to lower its resistance when subjected to more light from said light means.

18. A control as in claim 11, wherein said first photoelectric means includes a voltage divider adapted to be connected across a voltage source and having a variable resistance photocell connected across said light means so as to increase the voltage across said light means when the ambient light increases.

19. A lighting control for turning an illumination source on and off in response to ambient light conditions, comprising photoelectric means responsive to the ambient light, said photoelectric means assuming variable electrical conditions in response to variation of the ambient light conditions, light component means coupled to said photoelectric means for producing varying conditions of brightness in response to changes in the electrical condition of said photoelectric means, photoelectric component means close enough to the light component means to be responsive to light therefrom and exhibiting electrical conditions which vary in response to light incident thereon and regeneratively coupled to said light component means for making the light from said light component means even brighter as the light turns bright and dimmer as the light turns dim so that at any time said component means exhibit one state or another corresponding to extreme conditions, and control means coupled to one of said component means and responsive to one or the other states for turning the source on or off.

* * * * *